United States Patent [19]

Ojha

[11] Patent Number: 4,987,447
[45] Date of Patent: Jan. 22, 1991

[54] CONTROL SHEET GENERATION FOR COPIERS AND PRINTERS

[75] Inventor: Purnendu S. Ojha, Rochester, N.Y.

[73] Assignee: Eastman Kodak Company, Rochester, N.Y.

[21] Appl. No.: 408,828

[22] Filed: Sep. 18, 1989

[51] Int. Cl.⁵ ............................................. G03G 15/00
[52] U.S. Cl. ..................................... 355/204; 355/210
[58] Field of Search ............... 355/200, 201, 203, 204, 355/210

[56] References Cited

U.S. PATENT DOCUMENTS 4,716,438 12/1987 Farrell .................................. 355/201
4,757,348 7/1988 Rourke et al. ................... 346/160 X Primary Examiner—R. L. Moses
Attorney, Agent, or Firm—Milton S. Sales

[57] ABSTRACT

Reproduction apparatus includes a scanner having an automatic document handler for stream feeding hardcopy originals to an exposure position. Job setup instructions are stored in memory, and are converted to a rasterized bit map of machine readable indicia corresponding to the setup instructions. A control sheet is produced according to the rasterized bit map so that future production runs with the same setup configuration can be produced with minimum operator intervention by scanning control sheets and converting indicia thereon to setup information.

4 Claims, 1 Drawing Sheet

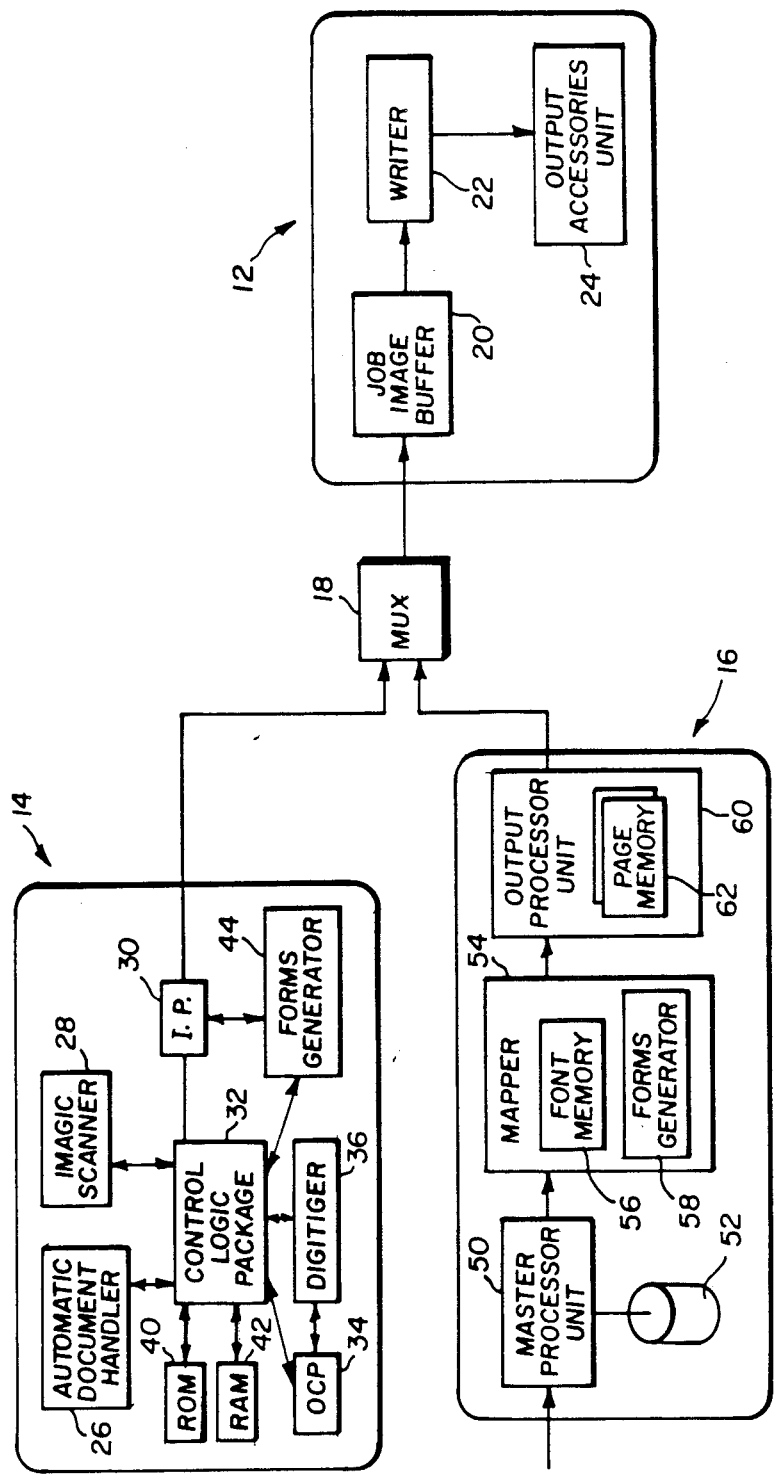

CONTROL SHEET GENERATION FOR COPIERS AND PRINTERS

BACKGROUND OF THE INVENTION

1. Technical Field

This invention relates generally to job steam programmers for reproduction apparatus such as document copiers and printers, and more particularly to the generation of control sheets bearing machine readable indicia corresponding to desired setup instructions for the apparatus.

2. Background Art

With the advent of high-speed copier and printer apparatus, the manual operation of entering setup instructions at an operator control panel has been replaced in some instances by interleaving pre-printed, operator-marked control sheets in the original document set to control the operation of the apparatus. See for example U.S. Pat. No. 4,248,528, which issued Feb. 3, 1981, to R. B. Sahay. However, an unnecessarily large amount of operator time and involvement is still necessary because the operator is required to manually mark the control sheet with the setup instructions. Manual marking also carries with it the risk of human error.

Pre-coded control sheets are disclosed in U.S. Pat. Nos. 4,757,348, which issued Jul. 12, 1988, to J. L. Rourke et al. and 4,763,161, which issued Aug. 9, 1988, to P.H. Forest et al. While pre-coded control sheets reduce the amount of operator intervention, they either restrict the number of variables which can be set or lead to an unmanageable number of different control sheets which must be stocked.

DISCLOSURE OF INVENTION

It is an object of the present invention to reduce the amount of operator involvement in the production of control sheets, while maintaining a high degree of flexibility in the amount and type of information which may be entered on the control sheets.

It is another object of the present invention to provide for the automatic production of control sheets corresponding to setup instructions stored in reproduction apparatus.

It is yet another object of the present invention to provide for the production of control sheets by the reproduction apparatus to be controlled during subsequent production runs.

According to one feature of the present invention, reproduction apparatus is provided with memory means for storing setup instruction signals which control operation of the reproduction apparatus. A control sheet is produced from the stored instruction signals; the control sheet bearing machine readable indicia corresponding to stored setup instruction signals. During subsequent production runs, the coded information on a control sheet is converted to setup instruction signals for controlling the reproduction apparatus during that subsequent run.

Preferably, the stored setup instructions are converted to a corresponding rasterized bit map of machine readable indicia, and the control sheet is produced according to the rasterized bit map. Means are provided for scanning control sheets and converting indicia thereon to seton information for said reproduction apparatus.

By the present invention, savings will be realized in terms of the amount of time required to prepare control sheets. In some print shops, an expert operator can spend some time, say in the morning, creating control sheets for all jobs to be run that day. Then less experienced operators can use the control sheets to set up the reproduction apparatus for specific production runs.

The invention, and its objects and advantages, will become more apparent in the detailed description of the preferred embodiments presented below.

BRIEF DESCRIPTION OF THE DRAWINGS

In the detailed description of the preferred embodiments of the invention presented below, reference is made to the accompanying drawings, in which the drawing is a schematic block diagram of reproduction apparatus according to the present invention.

BEST MODE FOR CARRYING OUT THE INVENTION

To assist in understanding the present invention, it will be described in connection with a preferred embodiment that includes an electrostatographic copier having an automatic document handler. It will be understood that the invention relates to printer as well as copiers, and to copiers without automatic document handlers.

With reference to the drawing, reproduction apparatus 10 includes a marking engine 12, a scanner 14, a raster image processor 16, and a multiple input controller 18 for selecting the input to the marking engine. Marking engine 12 incorporates paper handling and processing apparatus, such as for example electrostatographic equipment, necessary for producing fixed images on receiver sheets. It receives and stores, in a multiple-page image buffer 20, bit stream image data and control data. After appropriate processing, the data is inputted to a write head 22 for producing images on the receiver sheets. The marking engine further includes an output accessories unit 24. Several output functions may be available for receiver sheets, including selection of output trays, stapling, sorting, folding, finishing, mailbox, envelope receiver, etc.

Scanner 14 consists of an automatic document handler 26 for stream feeding hardcopy originals to be automatically read by an image scanner 28 such as a linear array of solid-state charge-coupled devices. The solid state device scans the input originals, converting their images to electronic bit stream data in page format for input to marking engine 12. This data may be manipulated by image processing electronics 30 having an algorithm to enhance the data.

One function of multiple-page image buffer 20 is to store all the pages of a particular job so that plural sets of collated pages may be produced without re-scanning the set of orginals for each set produced. As such, automatic document handler 26 need not be capable of recirculating the original, but the present invention extends as well to reproduction apparatus having recirculating document feeder type document handlers.

Scanner 14 also includes a control logic package 32 having an operator control panel 34 and digitizer 36. The control logic package is an interfacing medium for the operator to input functions and to receive messages from the reproduction apparatus. Setup instructions are input to the scanner, while information for finishing and processing of jobs will be sent to marking engine 12. The logic package consists of control software, interface software, and logic hardware.

As way of example only, functions inputted by the operator at the control panel may include image editing features such as area erase (blanking and framing), image shift, book copy modes, magnification, positive-to-negative image reversal, accent (spot) color, highlighting, forms overlay, screening selected areas for breaking a continuous tone orginial into dots for reproduction as haft-tone images, etc.

Default machine setup instructions are stored in a ROM 40. In the copier mode, an operator uses control panel 34 and digitizer 36 to input setup instruction values for storage in a RAM 42. Alternatively, setup instructions may be received via removable memory media from an off line computer, or the like. The setup instructions are used by image processing electronics 30 to modify the image data from scanner 28, or are transmitted as control signals to marking engine 12.

Often, it would be desirable to save the setup function instructions for subsequent jobs. Accordingly, control logic package 32 includes a forms generator 44 which reads the setup instruction values from RAM 42, and generates a rasterized bit map of machine readable indicia corresponding the setup instructions. The bit map of is transmitted to marking engine 12, which produces images on a receiver sheet.

Now, the receiver sheet bearing machine readable setup instructions can be inserted in a stack of originals to be copied, or it may be used in conjunction with a print job received over a computer link to precondition the printer configuration.

Various control sheets may be prepared and stored for later use. Therefore, it is desirable that forms generator 44 generates, as part of the rasterized bit map, a human readable indicia corresponding to the setup insructions so that the proper control sheet can be selected by an operator.

When the control sheet is scanned, the machine must recognize that it is indeed a control sheet and not an original document to be copied. One way is for the operator to press a special button to indicate that, say, the first sheet of a job is a control sheet. Now, when the sheet is scanned, control logic package 32 interprets the bit map of that control sheet as being job programming signals.

Preferably, however, forms generator 54 also produces an indicia on a predetermined region of the control sheets bit map that is characteristic of control sheets so that the scanner logic will recognize, say by comparison with a template in ROM, that the data on the sheet are not to be copied; but rather that the data are setup instructions. If a setup control sheet is detected, the setup information will be used for the job or the next original document, as appropriate. If a setup control sheet is not detected, the job will continue to be processed using the current setup parameters.

Raster image Processor 16 includes a master processor unit 50 which receives high level commands and data in character code form from a main frame computer, network link, data processing work station, removable memory media, FAX, or the like. The commands are translated into machine control language by the master processing unit. A job buffer 52 stores incoming jobs and program codes for use by the master processing unit.

After interpreting a job, master processing unit 50 parcels it to a mapper 54, which includes a font memory 56 for converting the character code data to a pixel pattern map. For color prints, the mapper separates the information into four raster patterns; one for each color available at marking engine 12. Mapper 54 may provide for character block moves, line drawing, trapezoidal fills, and windowing/clipping. It also includes a forms generator 58.

When the pixel pattern map is rasterized, mapper 54 sends page information to an output processor unit 60. The output processor unit has page memory 62, which stores image planes for transmission to marking engine 12. Preferably, there are two image plane stores so that one store can be being loaded while the other is being read to the marking engine. For use in an four color printer, one might want to provide eight image plane stores so that two four-color pages can be stored.

When the reproduction apparatus is used as a printer with document data coming into raster image processor 16, machine setup can be effected using a control sheet read by scanner 14 or by a separate dedicated scanner which is part of the raster image processor.

Control sheets may be designed so that they have no value assigned to one or more setup parameters. These control sheets are usable in instances wherein all but a few parameters are known ahead of time and the unassigned parameters are variable from job to job or within jobs. When such control sheets are used, the reproduction apparatus can prompt the operator to assign values for the unassigned parameters.

The invention has been described in detail with particular reference to preferred embodiments thereof, but it will be understood that variations and modifications can be effected within the spirit and scope of the invention.

What is claimed is:

1. Reproduction apparatus comprising:
   memory means for storing setup instructions signals for said reproduction apparatus;
   controller means responsive to the stored setup instruction signals for controlling operation of said reproduction apparatus;
   means for generating a control sheet bearing machine readable indicia corresponding to stored setup instruction signals wherein said generating means comprises a forms generator for converting stored setup instruction signals to a bit map of machine readable indicia; and
   reader means for converting the coded information on a control sheet to setup instruction signals.

2. Reproduction apparatus comprising:
   memory means for storing setup instruction signals for said reproduction apparatus;
   controller means responsive to the stored setup instruction signals for controlling operation of said reproduction apparatus;
   means for generating a control sheet bearing both machine readable indicia and human readable indicia corresponding to stored setup instruction signals; and
   reader means for converting the coded information on a control sheet to setup instruction signals.

3. Reproduction apparatus as defined in claim 1 wherein said generating means comprises a forms generator for converting stored setup instruction signals to a bit map of machine readable indicia and human readable indicia.

4. A copier of the type having an automatic document handler adapter to feed original documents to an exposure position, said copier comprising:

memory means for storing setup instruction signals corresponding to a selected job programming condition of the copier;

controller means responsive to the stored setup instruction signals for controlling operation of said copier in response to setup instructions;

means for generating a control sheet bearing machine readable indicia corresponding to said stored setup instruction signals wherein said generating means comprises a forms generator for converting stored setup instruction signals to a bit map of machine readable indicia; and reader means for converting the coded information on a control sheet to setup instruction signals for storage in said memory means.

* * * * *